Jan. 9, 1923.

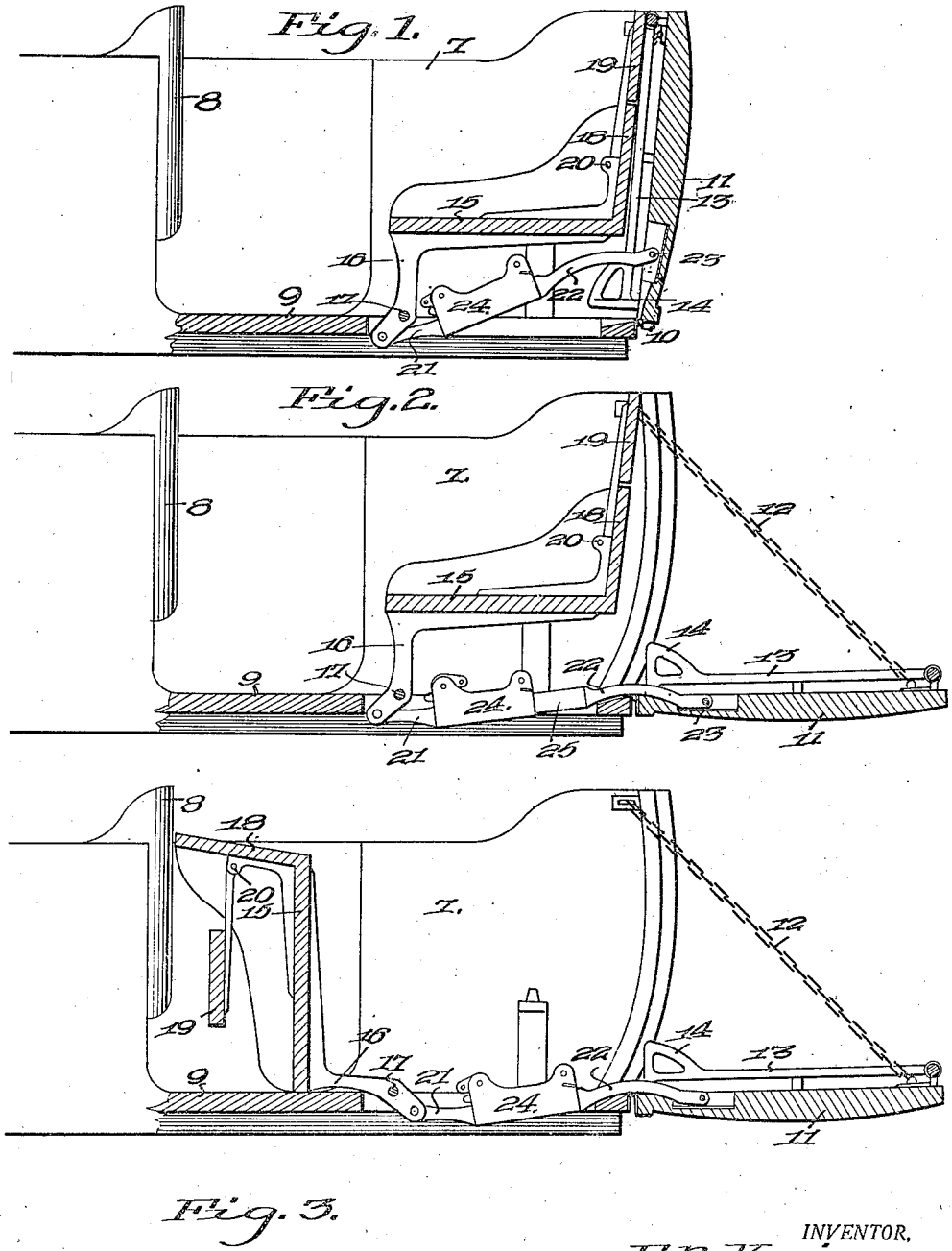

F. N. VANIER.
VEHICLE BODY.
FILED OCT. 24, 1921.

1,441,388.

2 SHEETS—SHEET 2.

INVENTOR.
F. N. Vanier,
BY
ATTORNEY.

Patented Jan. 9, 1923.

1,441,388

UNITED STATES PATENT OFFICE.

FRANCIS N. VANIER, OF INDIANAPOLIS, INDIANA.

VEHICLE BODY.

Application filed October 24, 1921. Serial No. 510,049.

*To all whom it may concern:*

Be it known that I, FRANCIS N. VANIER, a citizen of the United States, residing at Indianapolis, in the county of Marion and State of Indiana, have invented certain new and useful Improvements in Vehicle Bodies, of which the following is a specification.

The present invention relates particularly to body structures for self-propelled vehicles, though it may be successfully employed on vehicles of other types.

The object is to provide a structure in which a touring or passenger car may be readily converted into a truck or vice versa, or the touring body may be, in effect, extended to provide a support for luggage, while maintaining the seat arrangement in its normal condition.

The preferred embodiment of the invention is illustrated in the accompanying drawings, wherein:—

Figure 4:
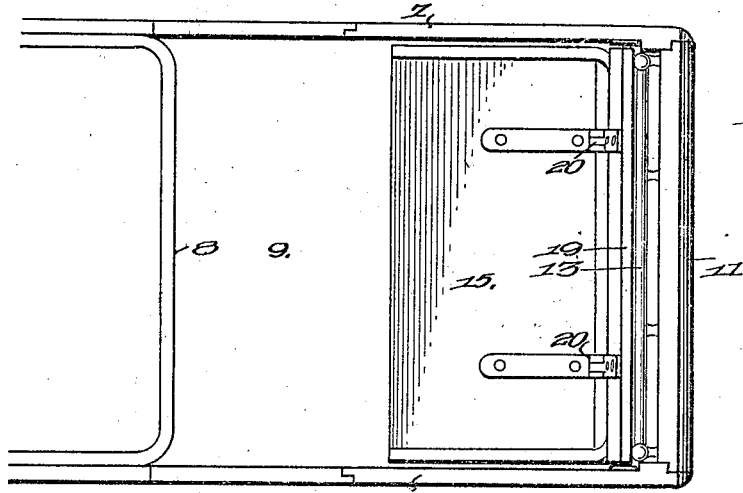
Figure 5:
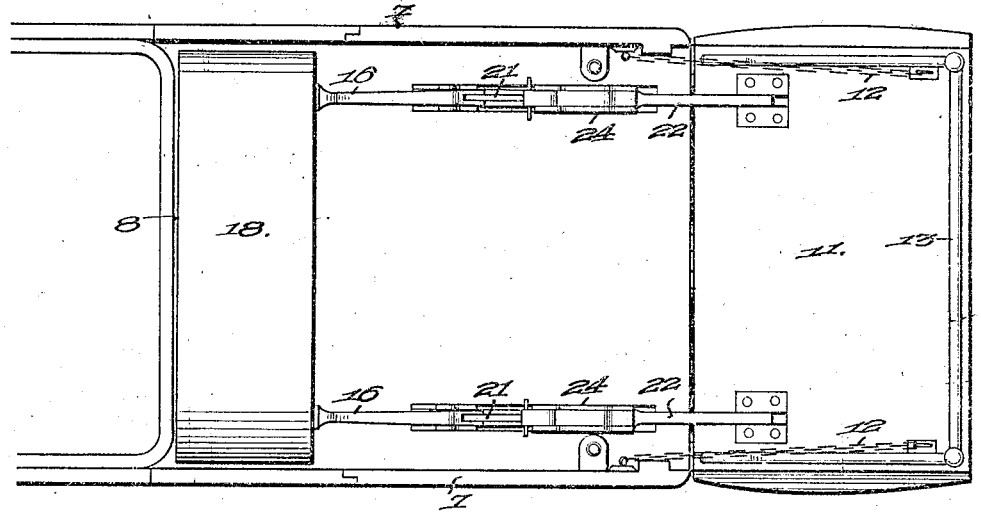
Figure 6:
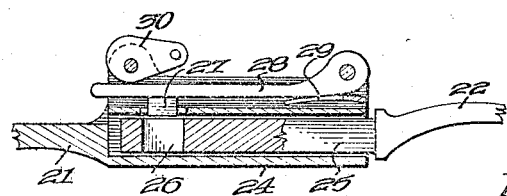

Figure 1 is a vertical longitudinal sectional view through the rear portion of a vehicle body, showing the rear seat in operative position and the tail gate in its upright relation, Figure 2 is a similar view, illustrating the tail gate in substantially horizontal position where it will act as a luggage carrier, Figure 3 is a sectional view showing the rear seat in an inoperative position and the tail-gate in horizontal position, producing an extended supporting bottom and providing in effect a truck body, Figure 4 is a top plan view of the structure as illustrated in Figure 1, Figure 5 is a top plan view of the relation of parts as shown in Figure 3, Figure 6 is a detail sectional view through the connection between the sections of one of the links.

In the embodiment disclosed, the vehicle body is designated generally by the reference numeral 7, and may be of any desired character, having a front or driver's seat 8. The platform or bottom 9 of the body in rear of the seat 8 has hinged to its rear end, as shown at 10, a tail-gate 11 that is capable of swinging between an upright position and a substantially horizontal position. The latter position is determined by suitable supporting chains 12 secured to it, and to the sides of the body. This tail-gate may have a low rail 13 on its inner side, and said rail terminates in upstanding portions 14 that lie within the plane of the body when the tail-gate 11 is in its outermost position.

A rear seat 15 is provided, with downwardly extending brackets 16 pivoted between their ends, as shown at 17 contiguous to the bottom 9, said seat having an upstanding back 18 that includes an upper section 19 hinged as shown at 20. The bracket arms 16 below the pivots 17 have connected thereto, the front ends of links comprising sections 21 and 22. The rear ends of these links are pivoted, as illustrated at 23, to the tail-gate above its hinged connection 10 with the bottom 9, as illustrated more particularly in Figure 1. The front section 21 of each link terminates at its rear end in a longitudinal boxing 24 and the front end of the other section 22 has a terminal portion 25 slidably mounted in said boxing. This portion 25 is provided with a transverse socket 26, in which is adapted to engage a locking lug 27 carried by a latch 28 pivoted on the exterior of the boxing 24. A spring 29, operating against the latch, normally urges it outwardly and a cam 30, also journaled on the boxing, operates against the latch to force it inwardly against the action of the spring.

The parts may assume three different relations. When the body is desired simply for passenger purposes the link sections 21 and 22 are locked together, the tail-gate is raised and the seat automatically assumes the position shown in Figure 1. If it is desired to utilize the tail-gate as a luggage carrier or the like the link sections 25 are released and the tail-gate swung to the position shown in Figure 2, with the rear seat still remaining in operative position. In case the structure is to be employed as a truck body, it is only necessary to swing the seat over to the position shown in Figure 3, with the link sections locked together, in which case the tail-gate will automatically swing from the position shown in Figure 2 to that shown in Figure 3. A reversal of the movement will obviously bring the parts back to the positions shown in Figures 1 and 4.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. The combination with a vehicle body, of a tail-gate movably mounted thereon, a seat movably mounted on the body, and rigid means connecting the seat and tail-gate for effecting their simultaneous movements in opposite directions, said means being operable to release the seat from the tail gate and permit the movement of one independently of the other.

2. The combination with a vehicle body, of a swinging tail-gate thereon, a forwardly swinging seat pivoted on the body, a link connection between the seat and tail-gate for effecting their simultaneous movements, and means for releasing said link also permitting the movement of one independently of the other.

3. The combination with a vehicle body, of a swinging tail-gate thereon a forwardly swinging seat pivoted on the body and a link connection between the seat and tail-gate for effecting their simultaneous movements said link connection comprising relatively movable sections and means for securing the sections against relative movement.

4. The combination with a vehicle body, of a swinging tail-gate thereon, a forwardly swinging seat pivoted on the body, and a link connection between the seat and tail-gate for effecting their simultaneous movements, said link connection comprising relatively slidable sections, and a fastener carried by one section and detachably engaging the other to hold the sections against relative sliding movement.

In testimony whereof, I affix my signature in the presence of two witnesses.

FRANCIS N. VANIER.

Witnesses:
 ALBERT C. PEARSON,
 CHARLES J. KAROBELL.